United States Patent
Gordon

(10) Patent No.: US 9,216,700 B2
(45) Date of Patent: Dec. 22, 2015

(54) HANDBAG HOLDER FOR VEHICLES

(76) Inventor: Kara Gordon, Glendora, CA (US)

( * ) Notice: Subject to any disclaimer, the term of this patent is extended or adjusted under 35 U.S.C. 154(b) by 571 days.

(21) Appl. No.: 13/072,645

(22) Filed: Mar. 25, 2011

(65) Prior Publication Data

US 2011/0284605 A1    Nov. 24, 2011

Related U.S. Application Data

(60) Provisional application No. 61/317,693, filed on Mar. 25, 2010.

(51) Int. Cl.
*B60R 7/00* (2006.01)
*B60R 11/00* (2006.01)

(52) U.S. Cl.
CPC ...................................... *B60R 11/00* (2013.01)

(58) Field of Classification Search
USPC .......... 224/572, 579, 580, 42.39; 410/97, 100
See application file for complete search history.

(56) References Cited

U.S. PATENT DOCUMENTS

| | | | | | |
|---|---|---|---|---|---|
| 1,639,563 | A | * | 8/1927 | Hays | 224/42.39 |
| 3,136,461 | A | * | 6/1964 | Gregg, Jr. | 224/540 |
| 4,592,734 | A | * | 6/1986 | Metiver | 441/74 |
| 5,358,307 | A | * | 10/1994 | Shafer et al. | 297/188.2 |
| 5,605,112 | A | * | 2/1997 | Schuman | 114/343 |
| 5,738,262 | A | * | 4/1998 | Andrini | 224/572 |
| 6,097,448 | A | * | 8/2000 | Perkins | 348/837 |
| 6,109,492 | A | * | 8/2000 | Eastwood | 224/276 |
| 6,209,768 | B1 | * | 4/2001 | Boaz | 224/314 |
| 6,216,927 | B1 | * | 4/2001 | Meritt | 224/275 |
| 6,237,999 | B1 | * | 5/2001 | Hobson | 297/256.15 |
| 6,293,447 | B1 | * | 9/2001 | Jorgensen | 224/275 |
| 6,318,612 | B1 | * | 11/2001 | MacNeil | 224/572 |
| 6,357,547 | B1 | * | 3/2002 | Kellog et al. | 182/9 |
| 6,390,345 | B1 | * | 5/2002 | Brown et al. | 224/578 |
| 6,588,365 | B2 | * | 7/2003 | Best Wright | 119/28.5 |
| 6,860,415 | B1 | * | 3/2005 | White | 224/275 |
| 6,892,912 | B1 | * | 5/2005 | MacNeil | 224/318 |
| 7,204,205 | B2 | * | 4/2007 | O'Donnell | 119/771 |
| 7,448,345 | B1 | * | 11/2008 | O'Donnell | 119/28.5 |
| 2005/0010147 | A1 | * | 1/2005 | Kazmierczak et al. | 602/4 |
| 2005/0092793 | A1 | * | 5/2005 | Berggren | 224/275 |
| 2005/0176508 | A1 | * | 8/2005 | Chastain | 463/46 |
| 2006/0081670 | A1 | * | 4/2006 | Sitzler et al. | 224/572 |
| 2008/0223889 | A1 | * | 9/2008 | Rossell et al. | 224/222 |
| 2010/0147913 | A1 | * | 6/2010 | Corets | 224/269 |
| 2010/0176167 | A1 | * | 7/2010 | Hudspeth | 224/275 |

* cited by examiner

*Primary Examiner* — Justin Larson
*Assistant Examiner* — Lester L Vanterpool
(74) *Attorney, Agent, or Firm* — Kristina M. Grasso, Esq. PLLC

(57) ABSTRACT

This invention provides a purse holder that has a base that sits and grips a car console, a pair of base straps that encircle the console to secure the base to the console, and a circular strap attached to the base that surrounds the purse and holds it to the base. The circular strap has a buckle attached at each end to open/close the circular strap for insertion/removal of the purse. An adjustable elastic strap allows the user to loosen/tighten the buckle to accommodate purses of different sizes. The circular strap is attached to the base via side straps that encircle the circular strap, fold over, and adhere to themselves. Plastic boning is sewn onto the side straps to provide stability and enable the side straps to stand upright to encase the purse. In one embodiment, the circular strap and the side straps have a removable fabric covering.

13 Claims, 6 Drawing Sheets

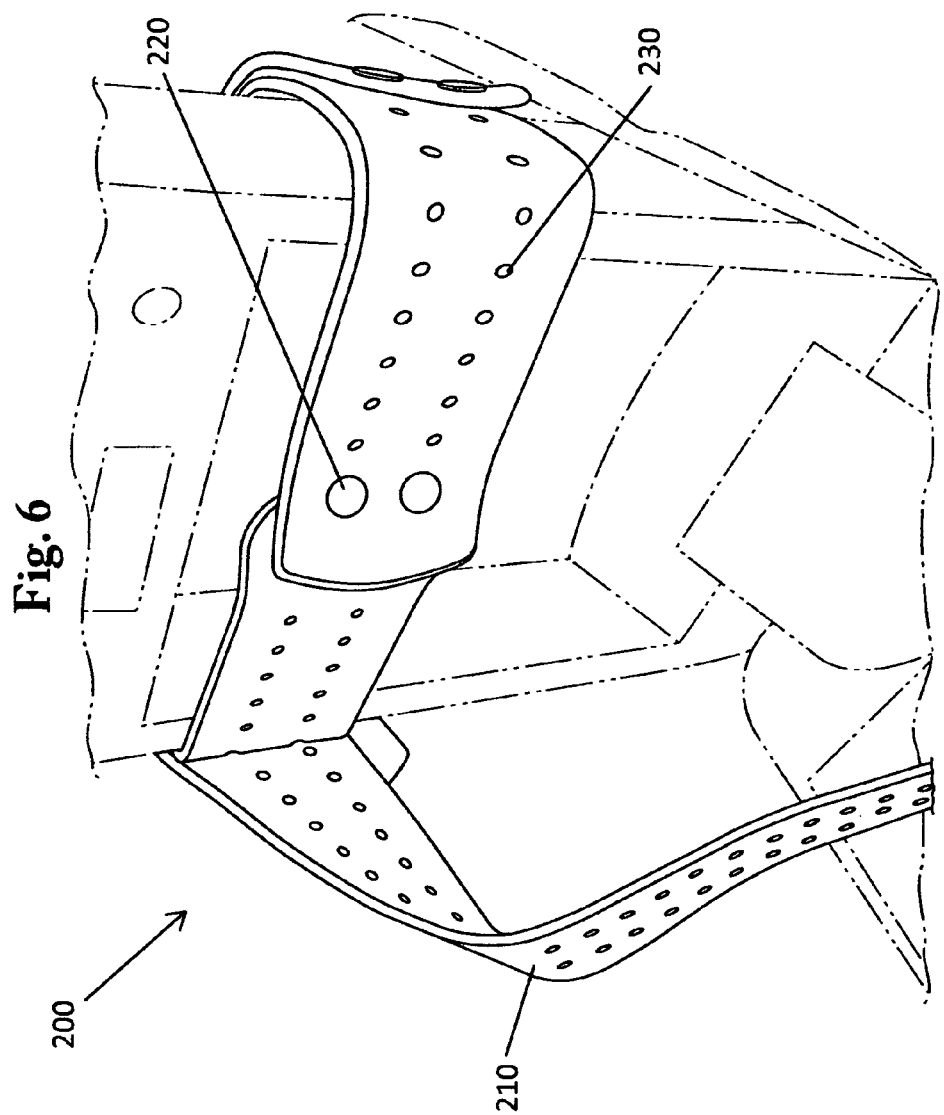

HANDBAG HOLDER FOR VEHICLES

CROSS-REFERENCE TO RELATED APPLICATION(S)

The present application claims the benefit of U.S. Provisional Application No. 61/317,693, filed Mar. 25, 2010, which is herein incorporated in its entirety by reference.

TECHNICAL FIELD

This invention relates to automobile accessories. More specifically, the invention relates to a device used to secure a handbag in a vehicle while driving.

BACKGROUND

The placement of a personal accessory such as a purse or handbag in an automotive vehicle often presents problems for the user. Placement on a seat prevents use of that seat by a passenger and the purse or handbag is subject to tipping over or even sliding off the seat during breaking maneuvers due to the momentum of the bag. Placement on the floor of the vehicle often results in the bag being out of reach of the driver and still subject to tipping. Placement on a console between the seats of a vehicle having individual front seats may prevent use of the console as an armrest, interfere with vehicle controls on the console, and/or be subject to tipping over or sliding off the console during braking or acceleration of the vehicle.

Proposed solutions to this problem have included devices that clip to the headrest of the passenger's seat such that the purse is suspended from or behind the passenger's seat and/or strapped into the passenger's seat. The problem with these devices is that they still prevent use of the passenger's seat, keep the purse out of reach of the driver, and limit access to the purse.

SUMMARY

This invention overcomes the disadvantages of the prior art by providing a purse holder that has a fabric covered neoprene base that sits and grips to the top of a car console, a pair of base straps made of hook and loop fasteners that encircle the console to secure the base to the console, and a circular strap attached to the base that surrounds the purse and hold it to the base. The circular strap has a buckle and/or fastener attached at each end to open and close the strap for insertion and removal of the purse. The fastener may be a magnet, snaps, or other suitable closure device. On one end of the buckle is an adjustable elastic strap to allow the user to loosen and/or tighten the buckle to accommodate purses of different sizes. The circular strap is attached to the base via a series of side straps made of hook and loop fasteners that encircle the circular strap, fold over, and adhere to themselves. Plastic boning is sewn onto the side straps to provide stability and enable the straps to stand upright to encase the purse. In one embodiment, the circular strap and the side straps have a removable fabric covering.

In an alternative embodiment, the purse holder is made of two rubber straps that may connect to each other at any point via removable plastic connectors that are inserted into corresponding apertures in the straps. The straps loop around the console and the purse and are adjustable.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The invention description below refers to the accompanying drawings, of which:

FIG. 6 is a perspective view of the alternative embodiment of FIG. 4 shown with the console in a open position.

DETAILED DESCRIPTION

Figure 1:
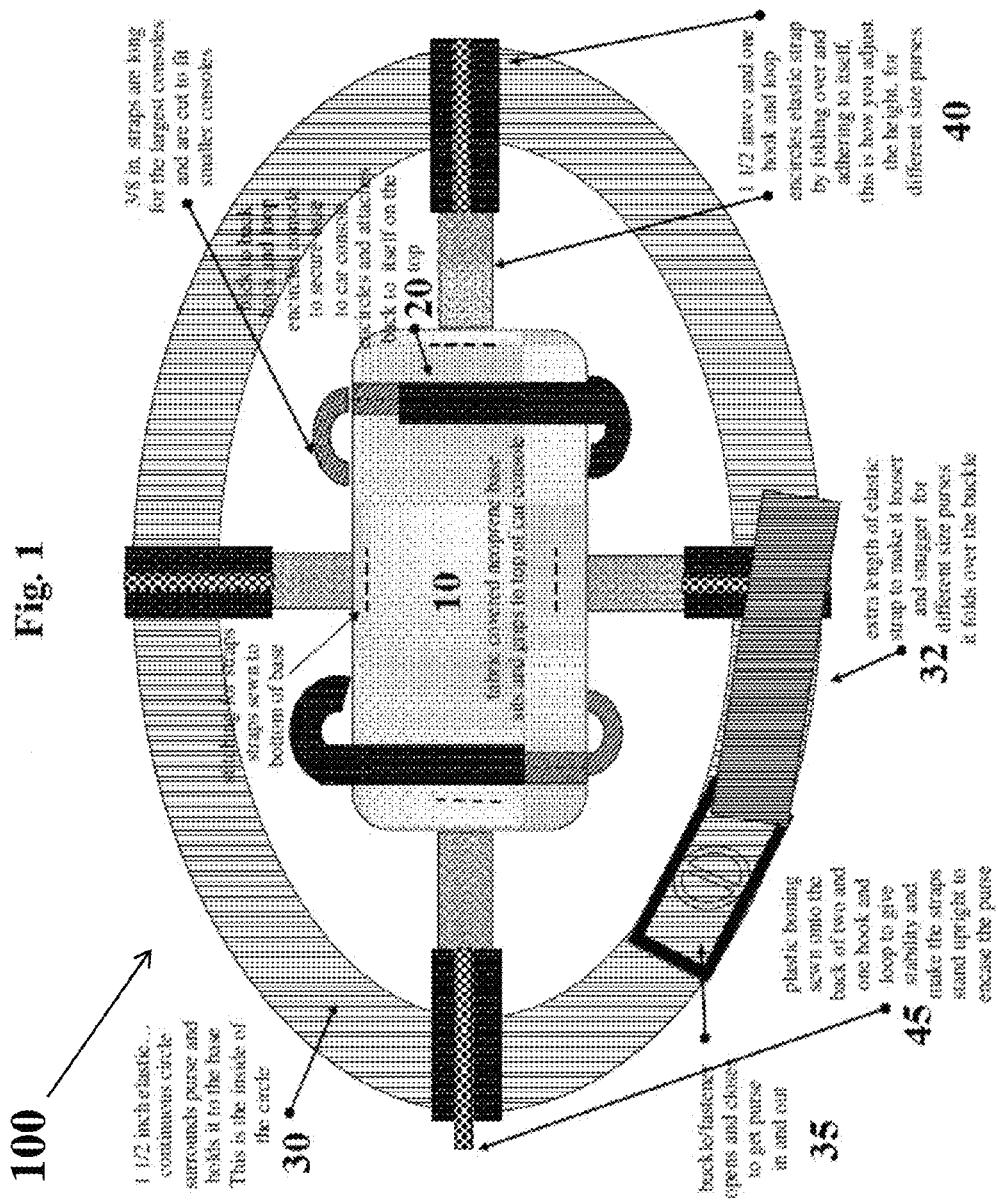
FIG. 1 is a top view of the purse holder of the present invention.
Figure 2:
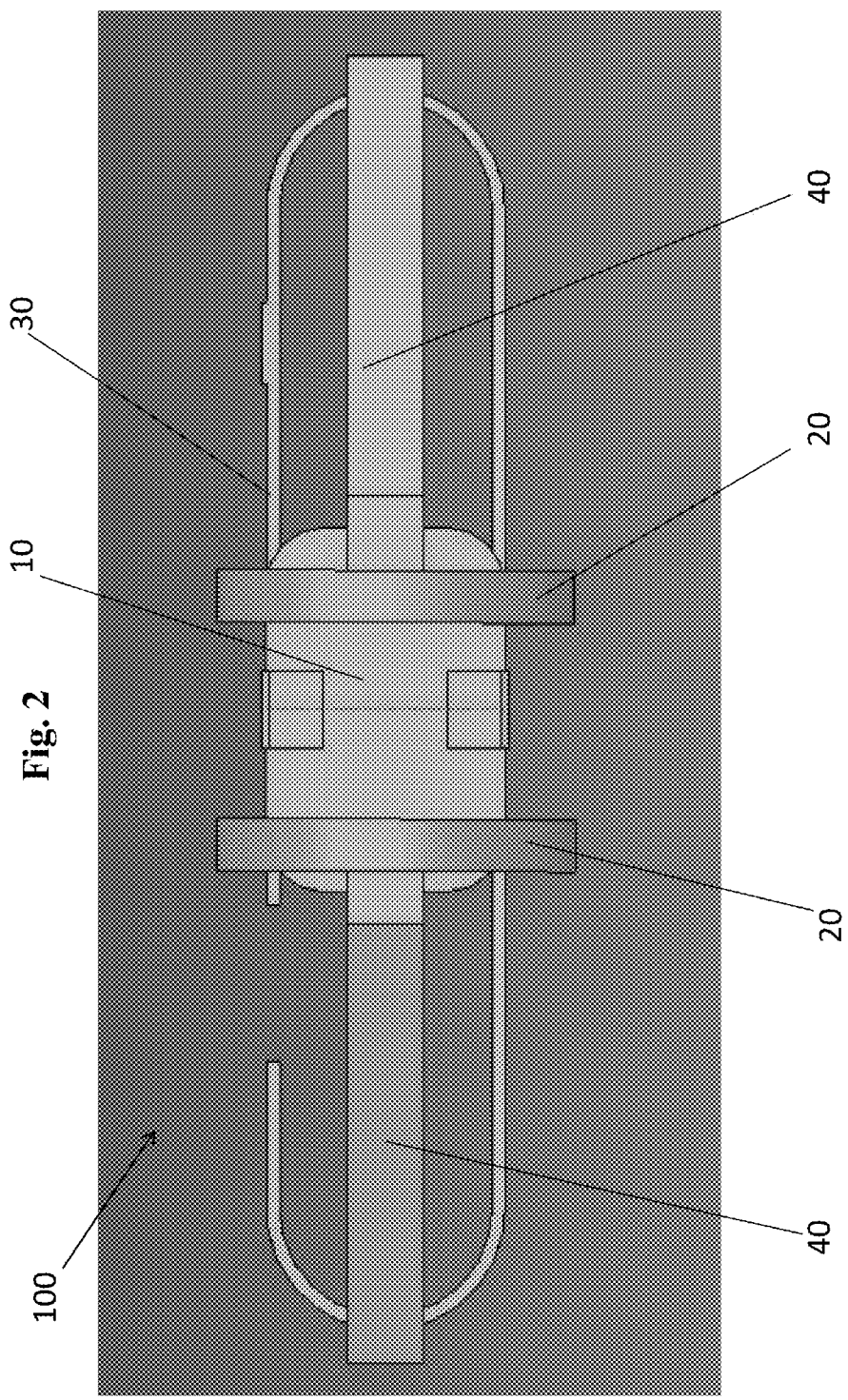
FIG. 2 is a bottom view of the purse holder of the present invention.
Figure 3:
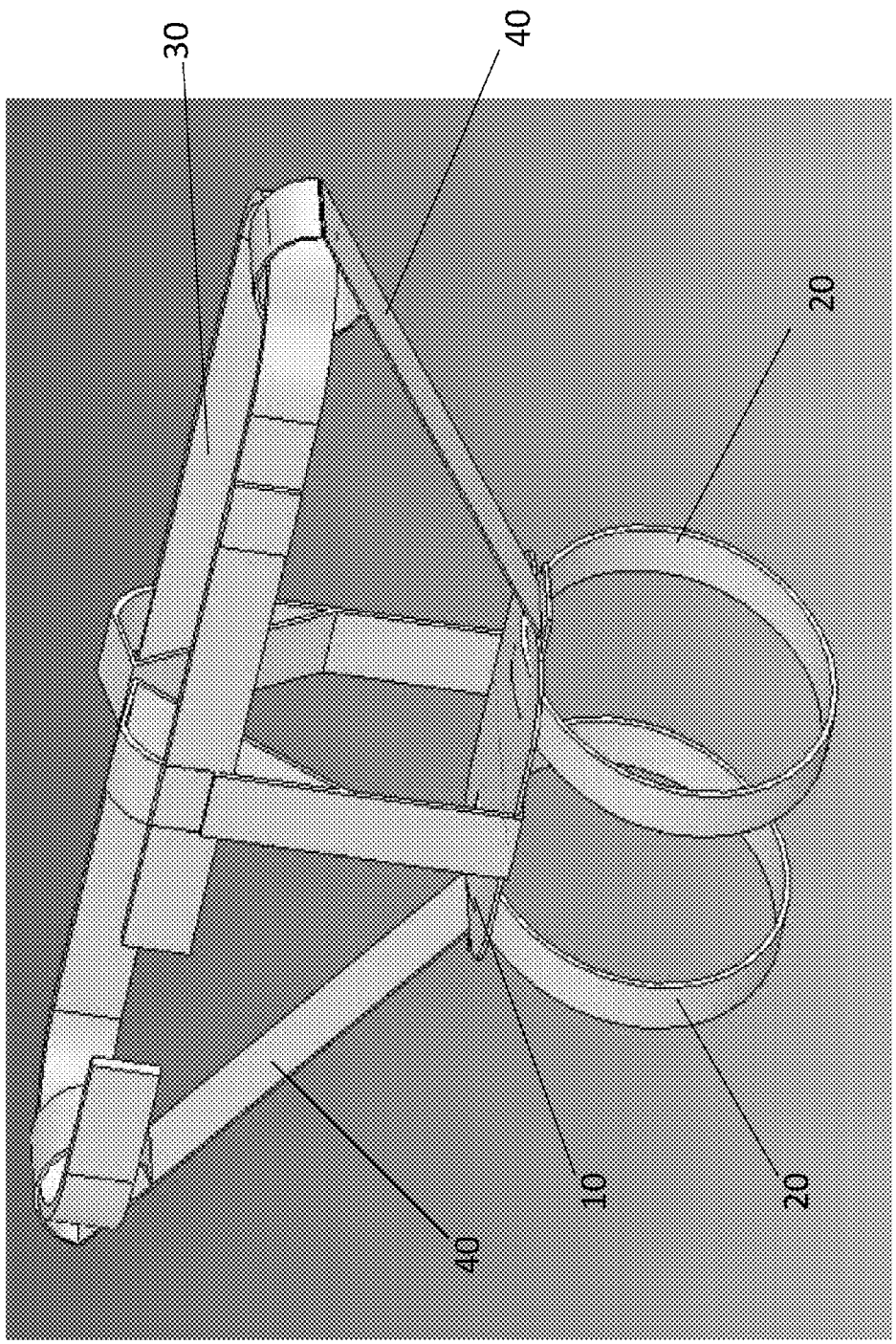
FIG. 3 is a perspective view of the purse holder of the present invention.

Referring to the drawings, FIGS. 1-3 in particular, a purse holder 100 is provided. Purse holder 100 has a base 10 that is positioned upon the console. Base 10 is configured such that it grips the console and does not slide. Base 10 may be made of neoprene or any other suitable material.

A pair of base straps 20 secure base 10 to the console. Base straps 20 encircle the console and base 10, then attach back to themselves. Base straps 20 are made of hook and loop fasteners. The hook and loop fasteners may be back to back hook and loop fasteners, which have hooks on one side and loops on the other side. In one embodiment, base straps 20 are ⅜ inches in width. Base straps 20 are cut to fit the appropriate width of the console. Base straps 20 do not interfere with use of the console.

A circular strap 30 surrounds the purse and holds it to base 10. Circular strap 30 is a continuous circle. Circular strap 30 is made of an elastic material. In one embodiment, circular strap 30 is 1½ inches in width.

At each end of circular strap 30 is a buckle 35. Buckle 35 opens and closes circular strap 30 to enable the user to insert and remove the purse. Attached to one end of circular strap 30 is a male buckle member, while a female buckle member is attached to the other end of circular strap 30. In alternative embodiments, another type of closure may be used, such as magnets or snaps.

An extra length of elastic strap 32 is attached to the end of circular strap 30 containing the male buckle member. Extra length of elastic strap 32 is used to loosen and/or tighten circular strap 30 to accommodate different size purses. Extra length of elastic strap 32 folds over buckle 35.

A series of side attachment straps 40 are attached to base 10. Side attachment straps 40 are also made of hook and loop fasteners. In one embodiment, two in one hook and loop fasteners are used. Two and one hook and loop fasteners are made of woven nylon, with both hooks and loops intermixed on a single surface, allowing interchangeable use. One end of each side attachment strap 40 is attached to the underside of base 10. The other end of side attachment straps 40 encircle circular strap 30 by folding over and adhering to itself. Side attachment straps 40 are used to adjust the height of circular strap 30 to accommodate different size purses. In one embodiment, side attachment straps 40 are 1½ inches in width.

Plastic boning 45 is sewn onto the back of each side attachment strap 40. Plastic boning 45 give side attachment straps 40 stability and make side attachment straps 40 stand upright to encase the purse.

In one embodiment, circular strap 30 and side attachment straps 40 have a removable fabric covering. The removable fabric covering for circular strap 30 is joined together at its edges by a hook and loop fastener, while the removable fabric covering for side attachment straps 40 is a sewn tube. The removable fabric covering may be made of a variety of materials having different patterns and textures.

Figure 4:
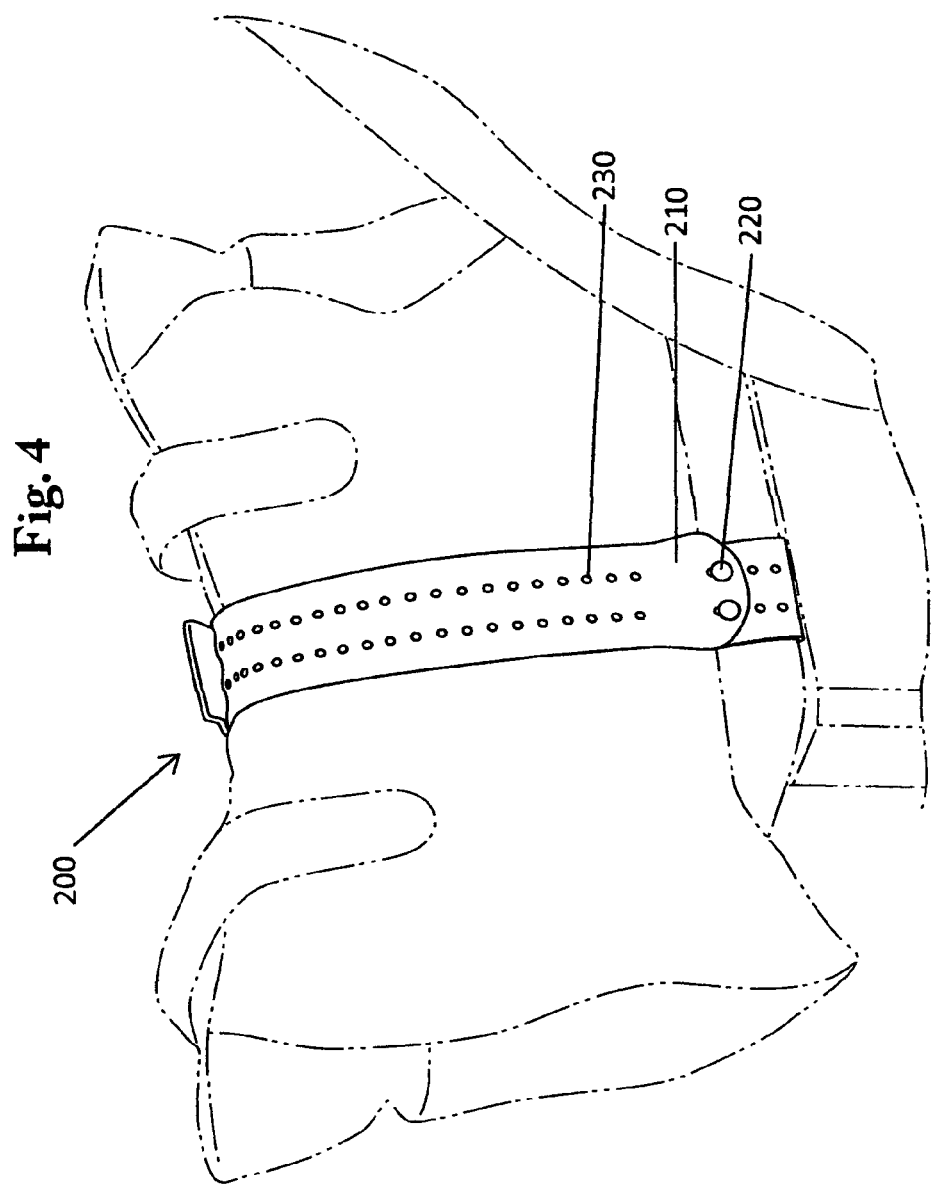
FIG. 4 is a front view of an alternative embodiment of the purse holder of the present invention.
Figure 5:
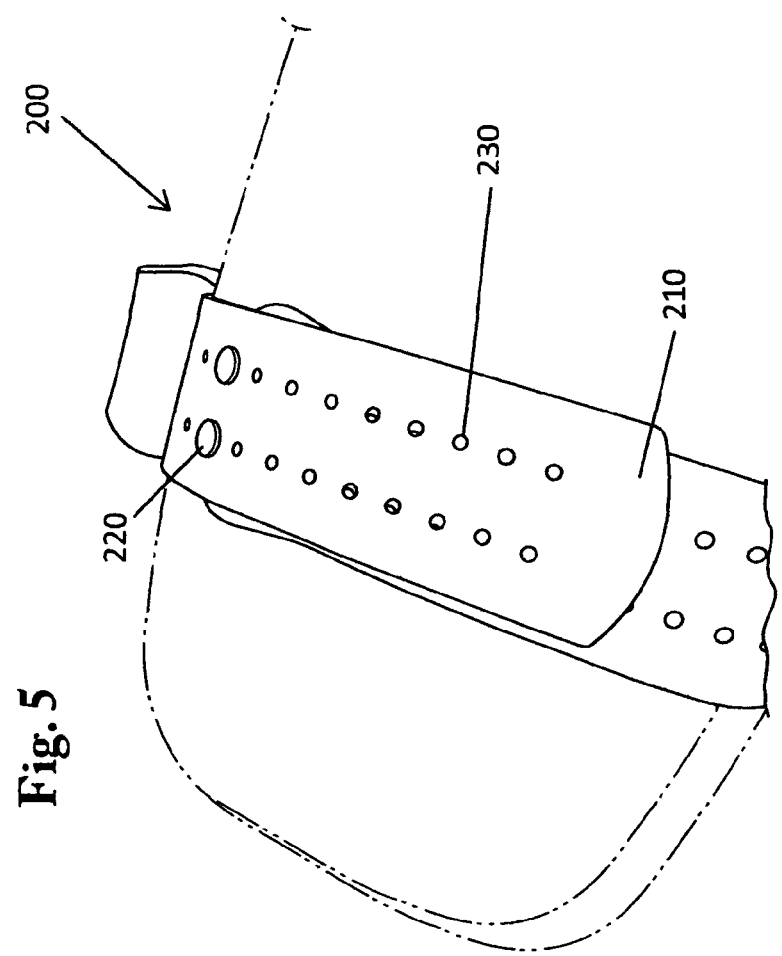
FIG. 5 is a perspective view of the alternative embodiment of FIG. 4 shown with the console in a closed position.

In an alternative embodiment of the present invention, shown in FIGS. 4-6, a purse holder 200 made of rubber straps 210 that can connect to each other at any point are provided. Straps 210 may be made of recycled materials. Straps 210 are joined together via removable plastic connector pegs 220 that are inserted into corresponding apertures 230 in the straps. Straps 210 loop around the console and the purse and are adjustable. Straps 210 and connector pegs 220 may be made in a variety of colors. Straps 210 do not interfere with use of the console.

The foregoing has been a detailed description of illustrative embodiments of the invention. Various modifications and additions can be made without departing from the spirit and scope if this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Accordingly, this description is meant to be taken only by way of example, and not to otherwise limit the scope of this invention.

The invention claimed is:

1. A handbag holder for vehicles comprising:
   a base;
   a plurality of base straps, wherein the plurality of base straps surround the base and secure the base to a console;
   a circular strap; and
   a plurality of side attachment straps, wherein each of the plurality of side attachment straps are attached to the base at a first end, and wherein a second end of each of the plurality of side attachment straps encircles the circular strap, wherein each of the plurality of side attachment straps further comprise a plastic boning component, the plastic boning component being affixed to a back side of each of the plurality of side attachment straps.

2. The handbag holder for vehicles of claim 1 wherein the plastic boning component is configured such that each of the plurality of side attachment straps stand upright.

3. The handbag holder for vehicles of claim 1 wherein the base is made of neoprene.

4. The handbag holder for vehicles of claim 1 wherein the base straps are made of hook and loop fasteners.

5. The handbag holder for vehicles of claim 1 wherein the circular strap is made of an elastic material.

6. The handbag holder for vehicles of claim 1 wherein the side attachment straps are made of hook and loop fasteners.

7. The handbag holder for vehicles of claim 1 wherein the side attachment straps are used to adjust the height of the circular strap.

8. The handbag holder for vehicles of claim 1 wherein the circular strap further comprises a buckle, the buckle having a male buckle member and a female buckle member, wherein the male buckle member is attached to a first end of the circular strap and the female buckle member is attached to a second end of the circular strap.

9. The handbag holder for vehicles of claim 8 wherein the male buckle member further comprises an elastic strap, wherein the elastic strap is used to adjust the tightness of the circular strap.

10. The handbag holder for vehicles of claim 1 wherein the circular strap further comprises a fastener selected from the group consisting of magnets, snaps, and a combination thereof.

11. The handbag holder for vehicles of claim 1 wherein the circular strap and each of the plurality of side attachment straps have a removable fabric covering.

12. The handbag holder for vehicles of claim 11 wherein the removable fabric covering for the circular strap is joined together at a first edge and a second edge by a hook and loop fastener.

13. The handbag holder for vehicles of claim 11 wherein the removable fabric covering for each of the plurality of the side attachment straps is a sewn tube.

* * * * *